Figure 1:
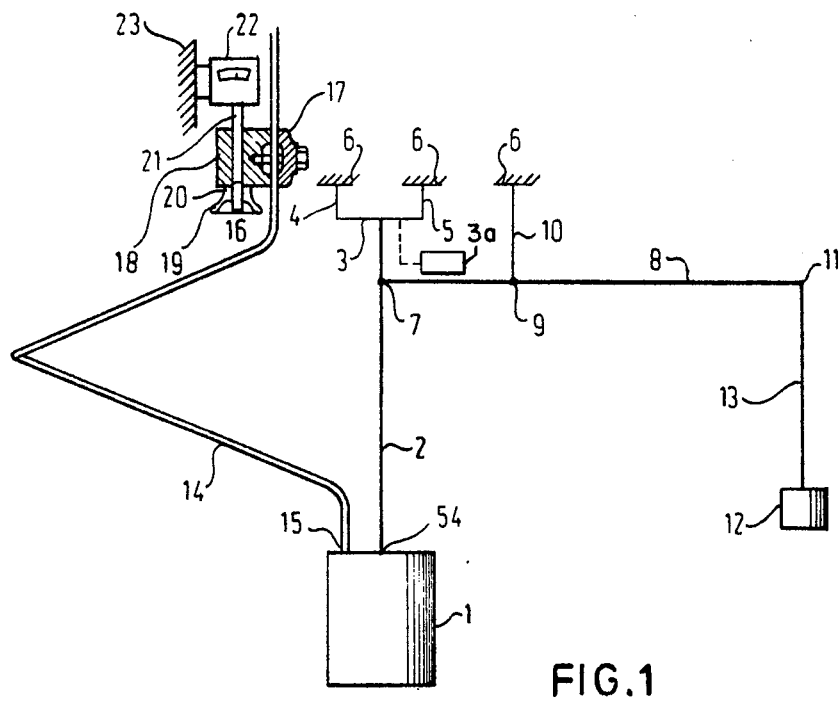

United States Patent [19]

Ruiter

[11] 4,094,370

[45] June 13, 1978

[54] VESSEL FOR WEIGHING MATERIALS

[75] Inventor: Johannes Petrus Ruiter, Bemmel (Gld), Netherlands

[73] Assignee: Stichting Energieonderzoek Centrum Nederland, The Hague, Netherlands

[21] Appl. No.: 707,257

[22] Filed: Jul. 21, 1976

[30] Foreign Application Priority Data

Aug. 26, 1975 Netherlands .......................... 7510033

[51] Int. Cl.² .......................... G01G 23/14; G01G 3/18
[52] U.S. Cl. ...................................... 177/168; 177/226
[58] Field of Search ................ 177/168, 169, 226, 227

[56] References Cited

U.S. PATENT DOCUMENTS 3,856,098  12/1974  Kuhnle ........................... 177/226 X Primary Examiner—George H. Miller, Jr.
Attorney, Agent, or Firm—Cushman, Darby & Cushman

[57] ABSTRACT

Vessel for weighing hot or cold fluid materials, having an elastic filling conduit of which a temperature difference may give a reading error. This error is corrected by a prestressing force on this conduit.

5 Claims, 9 Drawing Figures

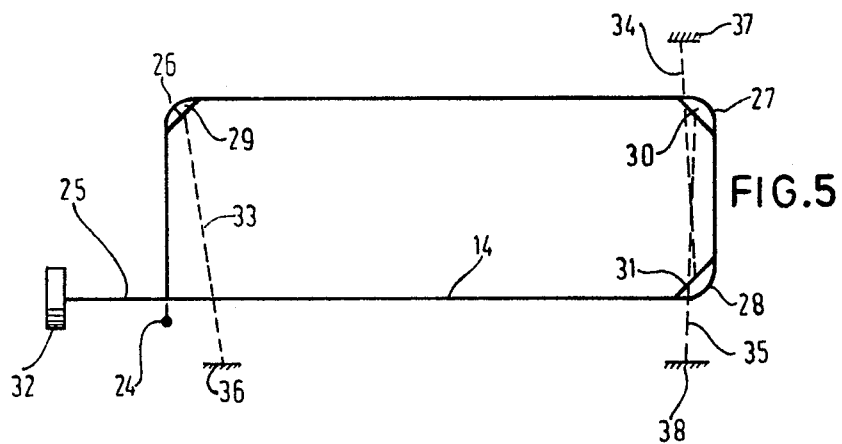
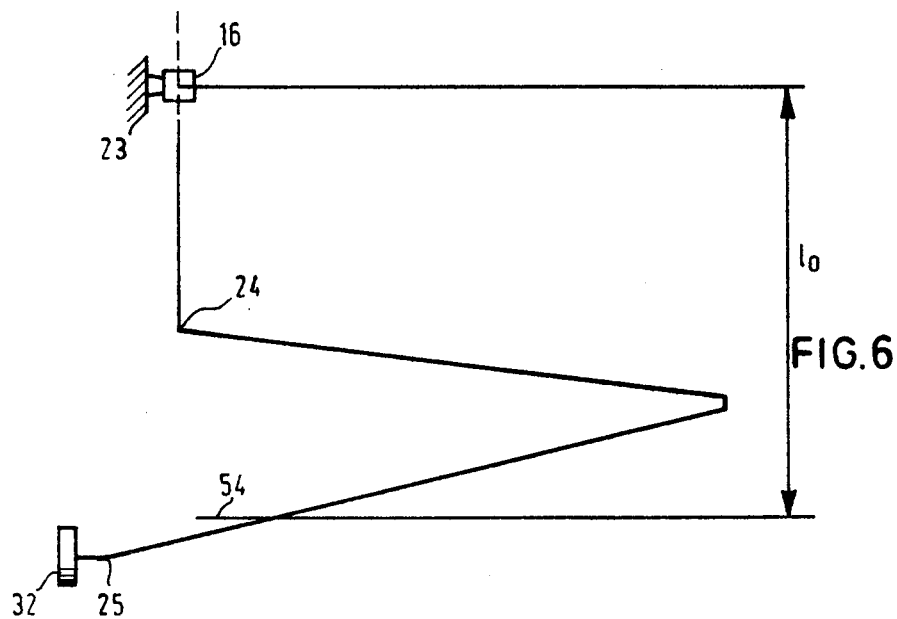

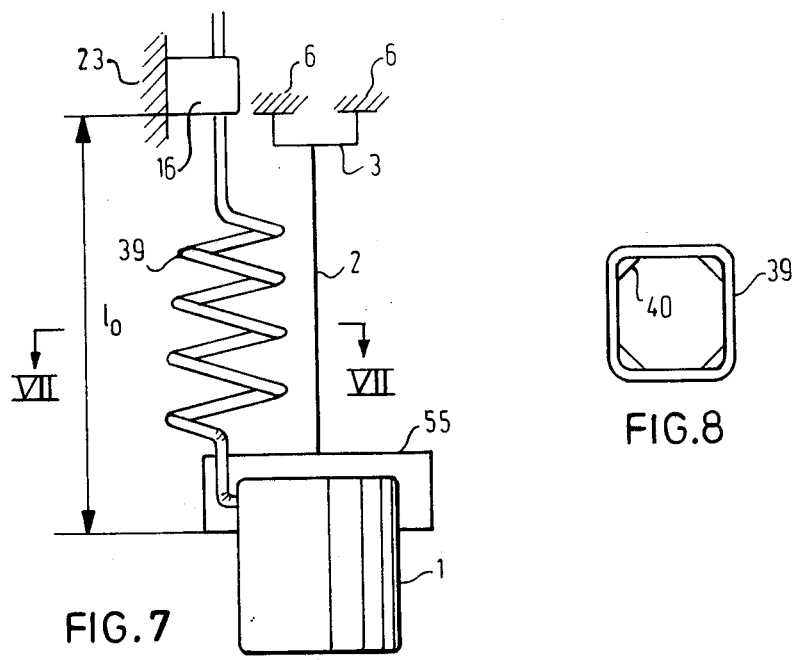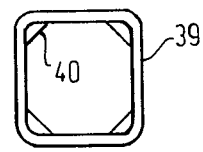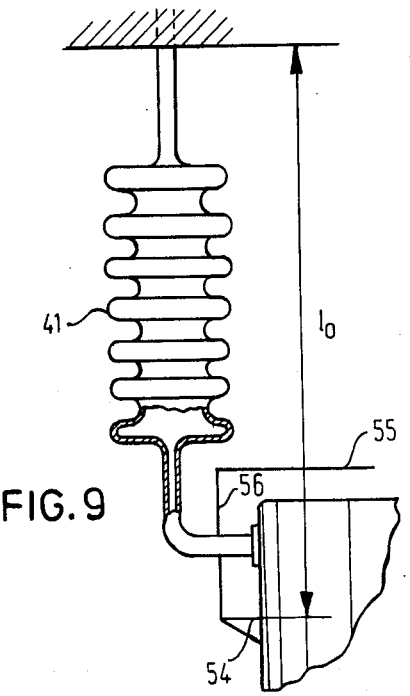

VESSEL FOR WEIGHING MATERIALS

The invention relates to a vessel intended for the weighing of materials having a temperature different from the ambient temperature, which vessel is supported with a mobility such that the force exerted by the weight of the material contained in the vessel is transferred to a weighing body mounted on a base, the deformation of which body is ascertained by means of at least one measuring member, and where the vessel is connected to the end of at least one elastic conduit, the other end of which is firmly supported in a suspension point of such a base.

Difficulties can occur in such weighing devices because the conduit or the supply line will also undergo a raise in temperature. Such difficulties arise chiefly when there is a difference in height between the joints of the conduit. Such an influence of temperature can result in a reading error. According to the invention, this reading error is for the greater part corrected by subjecting the conduit to a prestressing force such that the change in this prestressing force due to the elastic force modulus of the conduit changing with the working temperature corresponds as much as possible to the opposite change in the elasticity of the conduit resulting from its thermal change of length.

For such an elastic conduit it is possible to use an elastic conduit portion which can consist of a hollow torsion spring, a helically wound hollow spring, or of bellows.

The helically wound spring conduit is preferably coiled in the form of a polygon, with the corners stiffened against bending. The conduit is thereby mainly under a torsional load; in contrast to a spiral spring, however, the so called Bourdon effect (arising from pressure changes) can be greatly reduced.

To obtain the desired effect it is however also possible to make use of an elastic portion of the weighing vessel, e.g. an elastic top cover.

The afore-mentioned prestressing force can be derived in practice from the — for that purpose required — change in length of the elastic conduit. The elastic conduit can be assembled in such a manner that the stress in the conduit is first relieved, e.g. by placing it on a horizontal plane, whereupon the relaxed length of this part of the conduit is accurately measured. This length is then corrected with the calculated required change in length. Care must be taken during assembly to perform it so that the corrected length is established between the suspension point of the conduit and the suspension point of the measuring vessel.

The force necessary to produce the required prestressing force can however also be determined from the data mentioned here. The application of this force after assembly can then be checked by means of a dynamometer, if this is inserted between the base and the adjustable suspension point of the elastic conduit.

In some cases it may be useful to anchor a slack but elastic conduit, connected to the weighing vessel, in a few points in such a manner that these points, though they remain movable in the vertical direction, cannot move in a horizontal plane. This may be necessary when, e.g., the vessel or the conduit is exposed to impact loads due to the need of very quickly feeding or discharging the medium to be weighed. It appeared that such an anchoring can be performed very practically by stretching a number of thin cables in a nearly horizontal plane between a few fixed points and a few points of the conduit.

The principle of this invention and a number of embodiments will now be explained in detail with the aid of the following figures.

Figure 2:
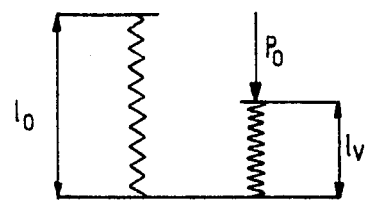
Figure 3:
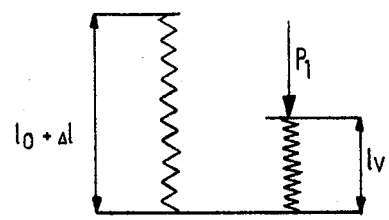
Figure 4:
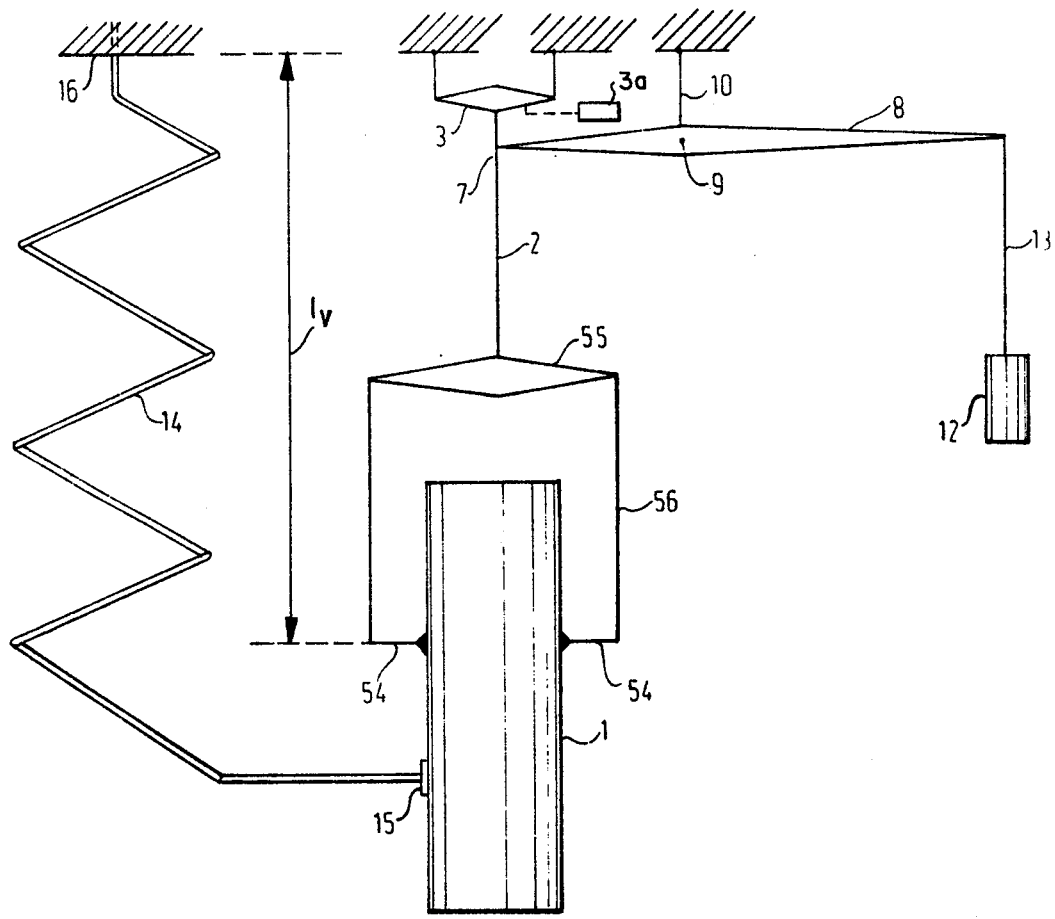

These represent:

FIG. 1 — a diagram of a weighing installation fitted with an adjustable suspension point, including a dynamometer;

FIG. 2 — a schematic representation of an elastic conduit at a temperature of $t_o$ in the relaxed and prestressed state respectively;

FIG. 3 — the same for the conduit at a temperature of $t_1$;

FIG. 4 — a schematically illustrated weighing installation with a suspension yoke for the weighing vessel;

FIG. 5 — a top view of an elastic conduit exhibiting a single spring turn;

FIG. 6 — a side view of the elastic conduit of FIG. 5;

FIG. 7 — a weighing vessel fitted with an elastic conduit according to a variant;

FIG. 8 — a horizontal sectional view of the spring winding of FIG. 7 according to a preferred embodiment;

FIG. 9 — a second variant of an elastic conduit portion.

Reference 1 in FIG. 1 designates a weighing vessel suspended in point 54 with the aid of cables, suspension strips or bands 2, fixed at the top on a measuring beam 3. A measuring means 3a for indicating the deformation of the measuring beam 3, and thus the weight of the vessel, is connected to the measuring beam 3. The measuring beam is suspended on a base 6 by two elastic joints which are also in the form of two strips 4 and 5. A balance beam 8 is attached to strip 2 at point 7 and is suspended in point 9 by a strip 10. A counterweight 12 is attached to the other end 11 of the balance beam B with the aid of a strip 13. The strip 10 is likewise attached to a base 6. Moreover, 14 represents a conduit leading from a base portion 23 to the weighing vessel 1. This conduit can be used, e.g., to feed liquids to vessel 1 which are to be subjected to a weighing process therein. Conduit 14 is formed so as to have a large degree of slackness with respect to vertical displacements of its lower end 15. The upper end 16 of this conduit is clamped against a vertically adjustable suspension point 18 of the elastic conduit by means of a clamping plate 17. As shown schematically in FIG. 1, this adjustment can be effected for example by firmly connecting a handwheel 19 to a rod 20 with external screw thread, turning in the vertically adjustable suspension point 18 fitted with an internal screw thread. The suspension point 18 can in this manner be shifted in the vertical direction by turning handwheel 19.

The upper end 21 of the rod is fixed in a base portion 23. The scale of dynamometer 22 shows the prestress present in the conduit 14 due to the deformation.

The effect of temperature variations to which a conduit is subjected can be calculated from the spring constant of such a conduit.

FIG. 2 illustrates a spring of length $l_o$ at a temperature of $t_{po}$. This spring is a schematic representation of a conduit 14. The force needed to compress this spring to a length $l_v$ is:

$$P_o = C_p(l_o - l_v) \quad [\text{kg}] \tag{1}$$

wherein:

$P_o$ = prestressing force [kg]

$C_p = B \cdot E_o$ = spring constant at a temperature of $t_{po}$ [kg/mm] (2)

$B$ = constant [mm]

$E_o$ = modulus of elasticity of the tube material at a temperature of $t_{po}$ [kg/mm²]

$l_o - l_v$ = preadjusted compression [mm]

$l_v$ = vertical length from fixed point 16 of the conduit to suspension point 54 of vessel, in prestressed state [mm]

FIG. 3 illustrates this spring at a temperature of $t_{p1}$. The length before compression is now: $l_o + \Delta l$. The force needed to compress this spring again to $l_v$ is now:

$$P_1 = C_p^*(l_o + \Delta l - l_v) \quad [kg] \quad (3)$$

wherein:

$C_p^* = B \cdot E_1$ = spring constant at a temperature of $t_{p1}$ [kg/mm] (4)

$E_1$ = modulus of elasticity of the tube material at a temperature of $t_{p1}$ [kg/mm²]

$\Delta l = l_o \cdot \alpha \cdot \Delta t_p$ = thermal expansion [mm] (5)

$\alpha$ = linear coefficient of expansion of the tube material [° C⁻¹]

$\Delta t_p = t_{p1} - t_{po}$ [° C]

Owing to the rise in temperature the spring has become longer, but also slacker. The effect of temperature variations manifests itself in the reduction of elasticity, and this amounts to:

$$T = P_o - P_1 = C_p(l_o - l_v) - C_p^*(l_o + \Delta l - l_v) \quad [kg] \quad (6)$$

Substitution of equations (2) and (4) in (6) results in:

$$T = B \cdot E_o(l_o - l_v) - B \cdot E_1(l_o + \Delta l - l_v) \quad (7)$$

Or:

$$T = B \cdot E_o(l_o - l_v)(1 - (E_1/E_o)) - B \cdot E_o \cdot \Delta l \cdot (E_1/E_o) \quad (8)$$

Equations (2) and (5) substituted herein results in:

$$T = C_p[(l_o - l_v)(1 - (E_1/E_o)) - (l_o \cdot \alpha \cdot \Delta t_p \cdot (E_1/E_o)] \quad (9)$$

The spring constant can be determined as follows:
$$C_p = C_2 - C_1 \quad (10)$$

wherein:

$C_2$ = spring constant of the weighing apparatus with tubes [kg/mm]
$C_1$ = spring constant of the weighing apparatus without tubes [kg/mm]

so that $$T = (C_2 - C_1)[(l_o - l_v)(1 - E_1/E_o) - (l_o \cdot \alpha \cdot \Delta t_p \cdot (E_1/E_o)] \quad (11)$$

If the conduits are mounted so that $(l_o - l_v)$ is just zero, then $l_o = l_v$ and the elasticity will increase. The effect of temperature variations then becomes:

$$T = -(C_2 - C_1) l_v \cdot \alpha \cdot \Delta t_p \cdot (E_1/E_o) \quad [kg] \quad (12)$$

However, from equation (11) it is also evident that to the conduits a prestress can be imparted such that the effect of temperature variation becomes zero for a certain increase in temperature $\Delta t_p$. The preadjusted compression must then be:

$$l_o - l_v = l_o \cdot \alpha \cdot \Delta t_p E_1/(E_o - E_1) \quad (13)$$

or:

$$l_o - l_v = l_v[\alpha \cdot E_1 \cdot \Delta t_p/(E_o - E_1) - \alpha \cdot E_1 \cdot \Delta t_p] \quad (14)$$

From (1) and (14) it follows that the required prestressing force is:

$$P_o = C_p \cdot l_v[\alpha \cdot E_1 \cdot \Delta t_p/(E_o - E_1) - \alpha \cdot E_1 \cdot \Delta t_p] \quad (15)$$

FIG. 4 shows in a schematic illustration of a weighing vessel, how the distance $l_v$ is measured. This is the distance between the fixed suspension point 16 and the plane of the suspension points 54 of vessel 1, by which the vessel is attached to the suspension point 55 via strips 56.

FIG. 5 shows in a top view, how such a conduit 14 can be actually constructed. The conduit illustrated here is wound as a single turn, beginning in point 24 and terminating in 25. The corners of this winding, coiled in polygonal form and designated by 26, 27 and 28, are reinforced with gusset plates 29, 30 and 31. As a result, changes in pressure have practically no effect on the winding. The conduit can be connected to the vessel by means of a flange 32. The numbers 33, 34 and 35 represent horizontally stretched thin steel cables, running from the gusset plates to the portions 36, 37 and 38 of the base. These thin steel cables support the elastic conduit in the horizontal direction without resisting a deformation in the vertical direction; they serve to absorb shocks caused by changes in the speed of the flowing liquid.

FIG. 6 represents a side view of the same conduit. The fixed point is again designated by 16, the length $l_o$ being the part of the conduit with elastic properties to be entered into the calculation.

FIG. 7 shows schematically that a weighing vessel can also be fitted with an elastic portion of a conduit of length $l_o$, designated here by 39, where it is possible to provide this portion of the conduit with several spring turns. A winding in polygonal form is again chosen by preference, as shown in FIG. 8 in a horizontal sectional view of the spring winding along VIII—VIII, the corners of the winding being again reinforced with gusset plates 40.

FIG. 9 shows that the elastic portion $l_o$ of the conduit can also consist of bellows 41. Such bellows can be used if the media to be weighed are not under a high or very high pressure.

As a matter of course, the weighing vessel discussed here can be fitted with separate conduits for discharging the material weighed. However, the same measures can be taken for these conduits as for the supply conduit so that these discharge conduits are not separately illustrated.

I claim:

1. In apparatus for weighing and handling a fluid material of the kind including a weighing vessel, a measuring beam fixed at spaced positions against downward movement and suspending said vessel between said positions so that said measuring beam is deformed by the weight of said vessel, a measuring member associated with said measuring beam for measuring the deformation of the latter and hence for indicating the weight of said vessel, and a material supply line for supplying fluid material to said vessel, the improvement wherein said supply line has at one end a resilient conduit-portion adapted to be elastically deformed, said conduit-portion being in communication with said weighing vessel for the flow of fluid material, and the conduit-portion at its other end being connected to an adjustable suspension point on a fixed base and being subjected to a prestressing force by means for adjusting the suspension point so that the required prestress is obtained such that the change in this prestressing force due to the change with the working temperature of the elasticity modulus of the conduit corresponds to the opposite change in the elastic force of the conduit resulting from its thermal change in length.

2. Apparatus according to claim 1, wherein said resilient portion of the conduit is in the form of a bellows.

3. Apparatus according to claim 1, wherein said resilient portion of the conduit forms an elastically deformable part of the vessel.

4. Apparatus according to claim 1, wherein said means are connected with a dynamometer for reading the prestress.

5. Apparatus according to claim 1, wherein the resilient conduit-portion is wound in a single turn and is anchored by means of structural elements permitting movement in a vertical plane, but offering resistance to movements in the horizontal plane, such as a set of at least two horizontally stretched taut suspension cables.

* * * * *